June 11, 1968 L. L. McCLELLAN 3,387,859
TRAILER FOR MOTOR BIKES

Filed March 28, 1966 2 Sheets-Sheet 1

LESLIE L. McCLELLAN
INVENTOR

Huebner & Worrel
ATTORNEYS

June 11, 1968  L. L. McCLELLAN  3,387,859
TRAILER FOR MOTOR BIKES
Filed March 28, 1966  2 Sheets-Sheet 1
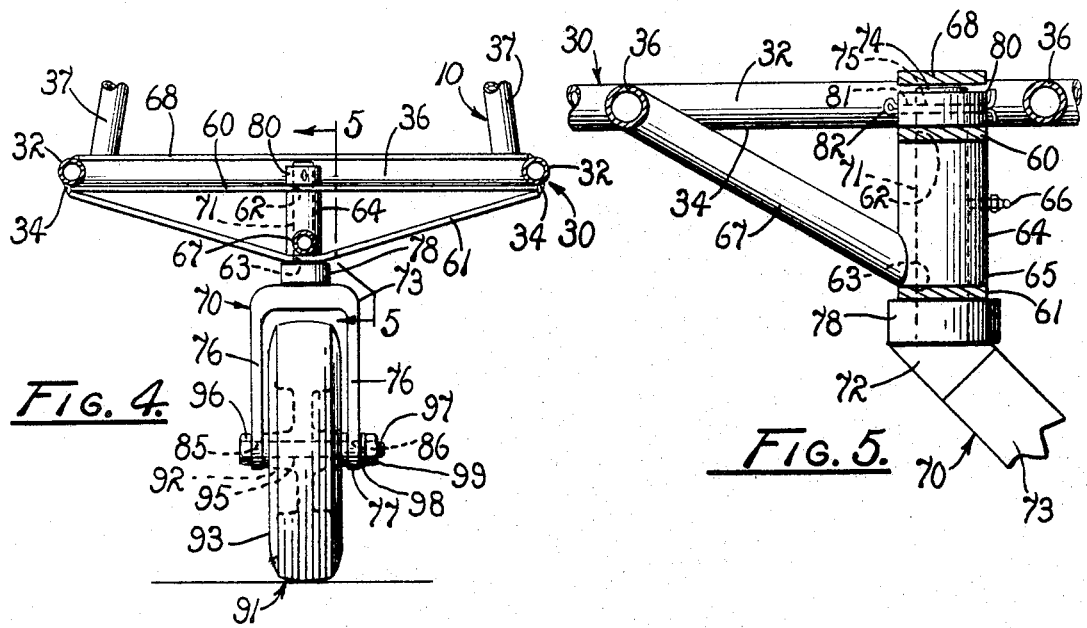
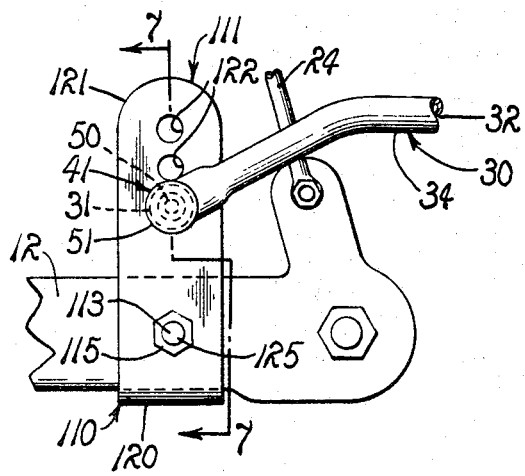
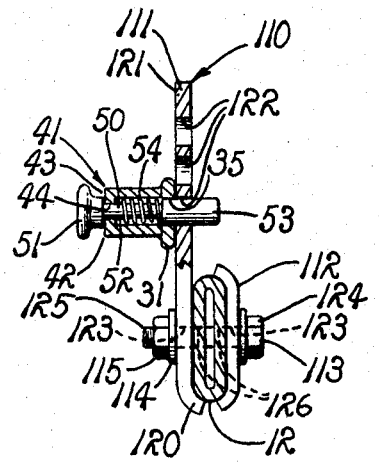
LESLIE L. McCLELLAN
INVENTOR
ATTORNEYS 3,387,859
TRAILER FOR MOTOR BIKES
Leslie L. McClellan, Tulare, Calif., assignor of forty-nine percent to Leonard D. Friday, Tulare, Calif.
Filed Mar. 28, 1966, Ser. No. 537,930
4 Claims. (Cl. 280—204)

ABSTRACT OF THE DISCLOSURE

A trailer for a two wheeled vehicle having a single swivel mounted ground engaging wheel disposed in angular depending relation from the trailer so that during movement of the vehicle the wheel is disposed in precisely aligned tracking relation thereto and including bracket means on the vehicle having a plurality of connector openings and connector means on the trailer extendible through said openings for releasably connecting the trailer to the vehicle.

---

It is currently popular both for reasons of economy and amusement to utilize two-wheel motor bikes of various types for transportation purposes. Not only do these motor bikes have a low initial purchase price, but they also are quite economical to operate and can maintain a substantial rate of travel. However, until the present time, they have been limited with respect to their load carrying capacity. Conventionally, there is only a small space behind the drivers seat which can accommodate a small package or at most an extra passenger. In the past in order to acquire a greater load capacity, side cars have been attached to motor bikes thus greatly increasing their load carrying capacity. However, there are numerous disadvantages to such a modification. Usually these side cars are of substantial size and weight thus greatly inhibiting the economical operation of the motor bike. The speed, gas mileage and handling characteristics of the modified motor bike are usually, significantly restricted. Furthermore, the initial cost of the side car is often prohibitive.

Therefore, it is an object of the present invention to provide an improved trailer which is adapted to be drawn by a conventional motor bike.

Another object is to provide such an improved trailer which significantly increases the load carrying capacity of the motor bike to which it is attached.

Another object is to provide a trailer of the character described which can be quickly and inexpensively adapted for attachment to any conventional motor bike.

Another object is to provide a trailer which is adapted to be quickly and conveniently connected and disconnected with respect to a motor bike without special tools.

Another object is to provide a trailer which detracts minimally from the speed, gas mileage and handling characteristics of the motor bike to which it is attached.

Another object is to provide a trailer which has a single wheel adapted to follow in precise trailing relation behind the motor bike to which it is attached.

A further object is to provide a trailer which is sturdy, lightweight and inexpensive to construct.

Still further objects of the present invention are to provide improved elements and arrangements thereof in a trailer for motor bikes of the character described and for the purposes set forth which is fully effective in achieving its intended functions.

These together with other objects and advantages of the present invention, will become more fully apparent upon reference to the following description in the specification and accompanying drawing.

In the drawings:

FIG. 4 is a somewhat enlarged fragmentary transverse vertical section through the trailer, taken on line 4—4 of FIG. 1, showing its wheel pivot mounting in front elevation.

FIG. 5 is a further enlarged fragmentary longitudinal vertical section through the trailer, taken on line 5—5 of FIG. 4, showing the wheel pivot mounting in side elevation.

FIG. 6 is a further enlarged fragmentary side elevation of a hitch and coupling assembly for the trailer of the present invention.

FIG. 7 is a transverse vertical section through the coupling assembly, taken on line 7—7 of FIG. 6.

Figure 1:
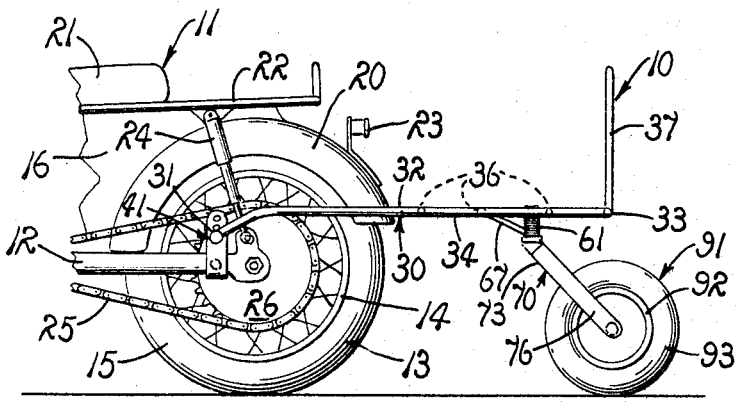
FIG. 1 is a side elevation of a trailer embodying the principles of the present invention, connected to the rear end of a motor bike, fragmentarily shown.
Figure 2:
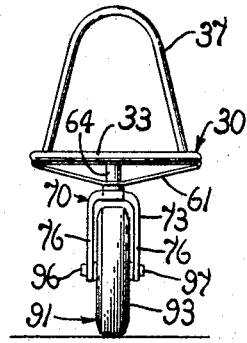
FIG. 2 is a rear elevation of the trailer of FIG. 1.

Referring in greater particularity to the drawings, a trailer embodying the principles of the present invention is generally indicated by the numeral 10. The trailer is adapted to be drawn behind a motor bike, the rear end of which is fragmentarily shown and indicated by the numeral 11. The motor bike provides side frames 12 in which is mounted rear wheel 13 for rotation about a substantially horizontal axis as shown in FIG. 1. A wheel includes a wheel hub 14 having an inflatable tire 15 mounted concentrically about the wheel hub. A body structure 16 is affixed on the side frames and provides a fender 20 which encloses the upper portion of the tire. A drivers seat 21 and load rack 22 are mounted on the body structure as shown in FIG. 1. A tail light 23 is affixed to the rear portion of the fender. A pair of shock absorbers 24 individually connect the load rack with the side frames on opposite sides of the rear wheel. A drive chain 25 and sprocket wheel 26 are provided to drive the rear wheel of the motor bike from an engine not shown.

The trailer 10 provides a continuous substantially U-shaped tubular frame 30 having a pair of identically formed, forwardly, downwardly extended coupling ends 31, a pair of parallel load support portions 32, and a rear portion 33. The load support portions have lower surfaces 34. A plunger hole 35, of a predetermined size, is provided in each coupling end of the frame. Three equidistantly spaced, parallel tubular support rods 36 are weldably mounted between and normal to the parallel load support portions. An arched tubular load brace 37 is mounted in upstanding relation on the rear portion of the frame.

A pair of coupling mechanisms 41 are individually, weldably affixed to the coupling ends 31 of the frame 30 and axially aligned with their respective plunger holes 35. Each coupling mechanism consists of a substantially cylindrical housing 42 having a distal end 43 with a rod hole 44 of predetermined size therein. A plunger 50, having a knob end 51, a rod portion 52, and a locking pin end 53, is slidably received within each housing. The knob end of each plunger engages the distal end of its respective housing and the locking pin end is extended through its respectively aligned plunger hole 35. A compression spring 54 is positioned about the rod portion of the plunger within each housing to hold the plunger in its normal extended position of FIG. 7.

Figure 3:
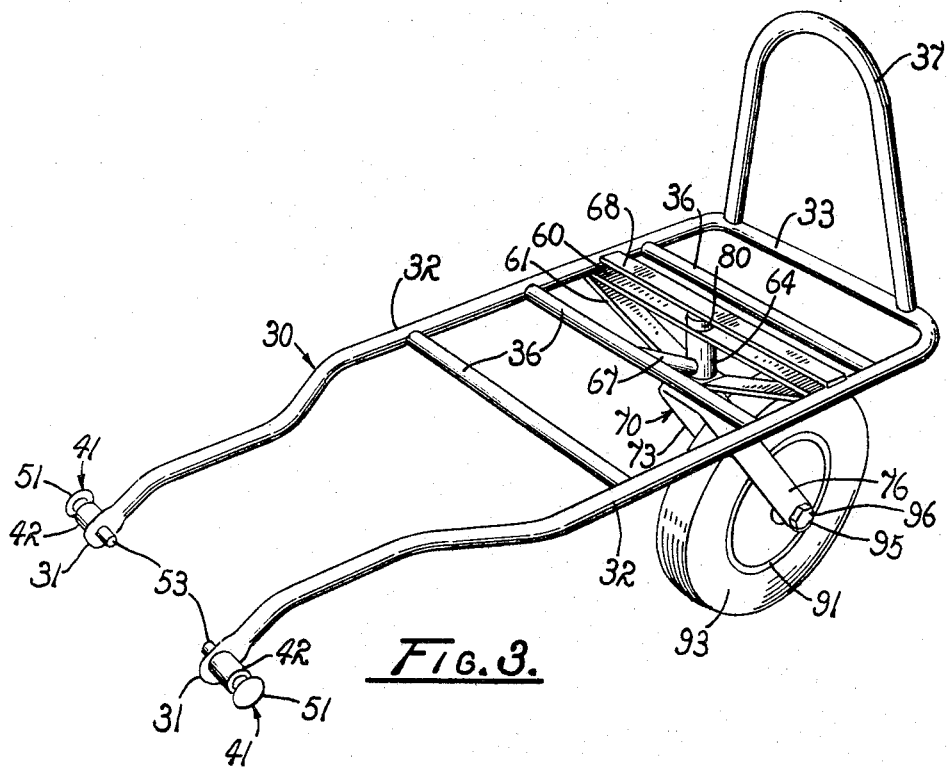
FIG. 3 is a somewhat enlarged perspective view of the motor bike trailer of the present invention with portions broken away for illustrative convenience.

A wheel mounting bar 60 is weldably mounted on the lower surfaces 34 of the load support portions 32 of the frame member 30 parallel to the support rods 36 and forwardly adjacent to the rearwardmost support rod nearest the load brace 37. As best shown in FIGS. 3 and 4, a substantially V-shaped bracket 61 is weldably affixed below the wheel mounting bar. A pair of pivot holes 62 and 63, of predetermined size, are individually provided centrally of the wheel mounting bar and the bracket, respectively, on a substantially vertical axis normal to the support rods 36. A cylindrical sleeve 64 has a lower portion 65 and an exterior grease fitting 66 mounted thereon which communicates with the interior of the sleeve. The inside diameter of the sleeve is substantially equal to that of the pivot holes. The sleeve is rigidly mounted between the wheel mounting bar 60 and the bracket 61, as by welding or the like, in precise alignment with the pivot holes. An elongated tubular brace 67 is weldably affixed individually at each of its ends to the lower portion of the sleeve and to the center support rod 36. An upper cover bar 68 is disposed in interconnecting relation between the load support portions 32 of the frame 30 in congruent upwardly spaced substantially parallel relation to the mounting bar 60.

A pivotable wheel mount 70 for the trailer 10 provides a pivot shaft 71, a wedge section 72, and a depending fork 73 which are integrally interconnected as by welding or the like. The pivot shaft provides an upper end 74 which has a bore 75 extended therethrough. The fork is extended at an angle of 45 degrees with respect to the axis of the pivot shaft and provides a pair of parallel arms 76 having spaced lower ends 77. A sealed axial thrust bearing 78 is mounted about the pivot shaft above the wedge section. The wheel mount is affixed pivotally in position on the trailer by the pivot shaft being rotatably received within the sleeve 64 with the fork normally rearwardly extended therefrom. In this position the lower portion 65 of the sleeve rests on the thrust bearing 78 and the upper end 74 of the pivot shaft extends a short distance outwardly from the sleeve. A lock collar 80, having a pair of diametrically opposed lock holes 81, is positioned about the upper end of the pivot shaft. A cotter key 82 is extended through the holes 81 and the bore 75 and its ends spread in the usual manner to constrain the collar and shaft in assembly to preclude inadvertent relative axial movement between the shaft and the sleeve.

A smooth bolt hole 85 is provided in the lower end of one of the arms 76 of the fork 73 and an internally threaded bolt hole 86 of the same diameter is provided in the lower end of the other arm. A ground engaging wheel 91, having a hub 92, and an inflatable tire 93, is rotatably mounted between the lower ends 77 of the fork 73. The wheel is mounted in position by an axle bolt 95, having a diameter receivable through the bolt holes 85 and 86. The axle bolt provides a head end 96 and an opposite threaded end 97. The axle bolt is received through the smooth bolt hole 85 of the fork and is threaded into the threaded bolt hole 86. The threaded end of the axle bolt extends a short distance out of the threaded bolt hole. A lock washer 98 and an internally threaded nut 99 are threadably tightened on the outwardly extending threaded end of the axle bolt thus locking the axle bolt in position.

A pair of trailer hitches 110 is adapted to be affixed to the motor bike 11 for attaching the trailer 10. As best shown in FIGS. 6 and 7, each trailer hitch includes a connection bar 111, an arcuately curved clamp 112, a mounting bolt 113, a lock washer 114 and a mounting nut 115. The connection bar has a lower curved end 120 and an opposite upper connection end 121. The connection end has a plurality of lock pin holes 122 each of which is slightly larger than the diameter of the lock pins 53. The curved end of the connection bar and the clamp have bolt holes 123 of a diameter slightly larger than that of the mounting bolt. The mounting bolt has a nut end 124 and a threaded end 125.

Operation

The operation of the described embodiment of the subject invention is believed to be readily apparent and is briefly summarized at this point. The pair of trailer hitches 110 are individually mounted on their respective side frames 12 of the motor bike 11 as shown in FIGS. 1, 6, and 7. This is accomplished by first drilling a side frame hole 126 through each of the side frames which is of the diameter of the bolt holes 123. The connection bar 111 and the clamp 112 of each trailer hitch are arranged in the positions shown in FIG. 7 with the connection bar on the outward side of each side frame and the hole 126 aligned with the bolt holes 123. The mounting bolt 113 is received through the side frame hole and bolt holes and the lock washer 114 and mounting nut 115 are threadably tightened on the threaded end 125 of the bolt so that the connection bar is held securely in the upright position of FIGS. 6 and 7.

Subsequently, when it is desired to use the trailer 10 in combination with the motor bike, the trailer is maneuvered on its wheel 91 so that each of the coupling ends 31 is adjacent to its respective trailer hitch. The knob end 51 of the plunger 50 of each coupling mechanism 41 is then grasped and pulled outwardly from its housing 42 against the force of the compression spring 54 until the lock pin 53 retracts within the plunger hole 35. The coupling ends are then positioned over their corresponding lock pin holes 122 and the plungers released so that the lock pins, under the force of the compression springs 54, are received in the desired lock pin holes. The compression springs keep their respective lock pins securely in their respective lock pin holes.

The motor bike trailer 10 is now ready for travel behind the motor bike 11. A passenger, or a load of a variety of types can be carried on the trailer. A load can be placed on the frame member 30 and tied in position. The load brace 37 acts to prevent the passenger or load from sliding off the rear of the trailer during travel. The wheel mount 70 is pivotable so that the ground wheel follows in precise trailing relation behind the wheels of the motor bike. The fork 73, being at a 45 degree angle to the pivot shaft 71, allows the wheel mount to pivot freely and to travel behind the motor bike without the usual harmonic oscillations experienced with conventional one-wheel trailers. Furthermore, this angle allows the wheel mount automatically to pivot a full 360 degrees during alternate backing and forward movement of the bike. Moreover, the single wheel structure of the present invention minimizes road friction which in multi-wheel trailers detracts from the handling characteristics of the motor bike.

In order to disconnect the trailer 10 from the motor bike 11, the knob ends 51 of the coupling mechanisms 41 are again merely pulled outwardly thus removing the lock pins 53 from their respective lock pin holes 122 of the trailer hitches 110. The trailer is, then, easily and conveniently moved away from the bike and because of its lightweight structure is easily wheeled by hand to a storage area. Thus, the present invention provides an improved trailer 10 which can carry a substantial load, is of inexpensive initial cost and does not appreciably affect the overall handling characteristics of the motor bike to which it is attached.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A trailer for a motorcycle comprising a frame having a forward connecting end and an opposite rearward end, a ground engaging wheel disposed in depending relation from the frame, an elongated substantially upright pivot shaft mounted for rotation about a substantially vertical axis on the rearward end of the frame, an elongated forked arm downwardly outwardly extended from the shaft at a 45° angle and providing spaced lower ends mounting said ground engaging wheel about an axis of rotation below the shaft for swiveling movement of the wheel during movement of the motorcycle so that the wheel is disposed in precisely aligned tracking relation thereto for extension toward the rearward end of the frame during forward movement of the motorcycle and extension toward said forward end of the frame during rearward movement of the motorcycle, a pair of connector members mounted on said forward end of the frame individually providing normally extended spring biased plungers, and a pair of brackets mounted on the motorcycle having a plurality of openings therethrough for individually selected releasably receiving said plungers of the connector members.

2. A trailer for a two wheeled vehicle comprising a frame having a forward connecting end and an opposite rearward end, a ground engaging wheel, an elongated pivot shaft rotatably mounted on the frame, an elongated forked arm downwardly angularly outwardly extended from the shaft providing spaced lower ends mounting said ground engaging wheel for swiveling movement during movement of the vehicle so that the wheel is disdosped in precisely aligned tracking relation thereto for extension toward the rearward end of the frame during forward movement of the vehicle and extension toward said forward end of the frame during rearward movement of the vehicle, connector means mounted on said forward end of the frame, and bracket means mounted on the vehicle having a plurality of connector openings therein with said connector means on the frame being selectively releasably extendible through said openings for releasably connecting said trailer to the vehicle.

3. In combination with a tractive element such as a motorcycle or bicycle having a single rear wheel rotatable about an axis, a trailer comprising a frame having forward and rearward end portions, a swivel wheel mounted on the frame in supporting relation to the rearward end portion thereof, the forward end portion of the frame having a pair of arms extended forwardly therefrom on opposite sides of said rear wheel of the tractive element, means on opposite sides of the tractive element adjacent to the rear wheel having sockets therein oppositely disposed from the tractive element in substantial alignment substantially parallel to the axis of said rear wheel, and lock pins individually mounted in the forward ends of the arms and releasably engaged with the sockets on their respective sides of the tractive element.

4. The combination of claim 3 in which the lock pins are spring pressed to socket engaging positions and are retractable against such spring pressure for removal therefrom.

References Cited

UNITED STATES PATENTS

| | | | |
|---|---|---|---|
| 2,057,655 | 10/1936 | Anthony et al. | 280—460 |
| 2,104,734 | 1/1938 | Carpenter | 280—495 X |
| 2,216,584 | 10/1940 | Boden | 280—495 X |
| 2,471,184 | 5/1949 | Andrews | 280—495 |
| 2,564,996 | 8/1951 | Rasbach | 280—78 X |

FOREIGN PATENTS

| | | |
|---|---|---|
| 408,643 | 1/1945 | Italy. |
| 1,091,332 | 10/1954 | France. |

KENNETH H. BETTS, *Primary Examiner.*